(12) United States Patent
Berghoff

(10) Patent No.: US 7,156,364 B2
(45) Date of Patent: Jan. 2, 2007

(54) LEVER DRIVE FOR A CRYOGENIC VALVE

(75) Inventor: Rudolf Erwin Berghoff, Wedel (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/960,958

(22) Filed: Oct. 12, 2004

(65) Prior Publication Data
US 2005/0133755 A1   Jun. 23, 2005

(30) Foreign Application Priority Data
Oct. 10, 2003   (DE) ................ 103 47 127

(51) Int. Cl.
    *F16K 31/12* (2006.01)
(52) U.S. Cl. ................ 251/58; 251/243
(58) Field of Classification Search ............ 251/58, 251/231, 236, 242, 243, 62
    See application file for complete search history.

(56) References Cited

U.S. PATENT DOCUMENTS

| 677,940 A * | 7/1901 | Carr .................. 251/58 |
| 2,490,555 A | 12/1949 | Songer |
| 2,708,093 A * | 5/1955 | Leber ................ 251/58 |
| 3,260,496 A | 7/1966 | Borcherdt |
| 3,684,237 A | 8/1972 | Hyde et al. |
| 3,765,438 A | 10/1973 | Di Sciascio |
| 3,970,280 A | 7/1976 | Kunz |
| 5,074,325 A | 12/1991 | Rumberger et al. |
| 5,078,180 A | 1/1992 | Collins |
| 5,333,989 A * | 8/1994 | Missana et al. ........ 251/129.11 |
| 5,586,745 A * | 12/1996 | Knapp ................ 251/121 |
| 5,967,486 A | 10/1999 | McCrory et al. |

FOREIGN PATENT DOCUMENTS

| FR | 852211 | 1/1940 |
| GB | 853148 | 11/1960 |

* cited by examiner

*Primary Examiner*—John Bastianelli
(74) *Attorney, Agent, or Firm*—Crowell & Moring LLP

(57) ABSTRACT

A valve assembly for controlling flow of cryogenic fluids is disclosed. In an embodiment, the valve assembly includes a valve housing and a valve member supported at the valve housing for movement between a valve opened and a valve closing position. A pneumatic cylinder is disposed laterally spaced from the valve member and thermally isolated with respect to cryogenic fluids controlled by the valve member. A lever operatively connects the pneumatic cylinder with the valve member and a linkage is pivotally connected with the lever at a position spaced from the valve member. The valve member is a needle valve member supported for axial movement at the housing.

7 Claims, 6 Drawing Sheets

LEVER DRIVE FOR A CRYOGENIC VALVE

BACKGROUND AND SUMMARY OF THE INVENTION

This application claims the priority of 103 47 127.8 filed in Germany on Oct. 10, 2003, the disclosure of which is expressly incorporated by reference herein.

The invention relates to an actuator for a cryogenic valve having a pneumatic cylinder.

Different mechanical, electric or pneumatic actuators are known for a valve. However, the known solutions are not very suitable for actuating a cryogenic valve; that is, for actuating a valve which delivers a cryogenic medium, such as low-temperature liquefied gas.

It is therefore an object of the invention to provide an actuator for a cryogenic valve which is easy to manufacture and can be reliably operated.

This object is achieved in that the pneumatic cylinder is in an operative connection with the valve needle by way of a lever, the lever being rotatably connected on one side with a linkage.

The invention permits a spatial separation of the pneumatic system from the valve so that no cold transfer can take place from the cryogenic valve to the pneumatic parts. As a result, it is ensured that the pneumatic parts are subjected approximately to room temperature. The avoidance of the exposure of the pneumatic system to very cold temperatures prevents wear effects as a result of thermal tensions in the components and ensures a reliable operation of the pneumatic system and thus of the valve actuation. The construction of the actuator according to certain preferred embodiments of the invention requires a double-acting pneumatic cylinder which, when moving out into one direction, opens the valve and, when moving out into the other direction (moving in) closes the valve.

In certain preferred embodiments of the invention, the linkage itself is rotatably disposed. This has the advantage that, when the pneumatic cylinder is moved in and out, a small relative movement of the linkage per se is permitted and a tilting effect upon the valve is thereby prevented. While a rigid fastening of the linkage can still be tolerated during small valve movements or small angular movements of the valve, the rotatability allows larger movements.

In certain preferred embodiments of the invention, the lever can be connected with a spring. The spring can preferably be fastened to the other side of the lever—thus, opposite the linkage. When a spring is used, a single-acting pneumatic cylinder can be used as the pneumatic cylinder, which then only causes the opening of the valve. For closing the valve, the cylinder is switched to a driving pressure-free condition, and the spring, as a result of its tension force, pulls the valve back into the closed position. This has the advantages that a lower-cost pneumatic component can be used and that the contact pressure of the valve needle in the valve seat can be exactly predetermined by the spring.

In certain preferred embodiments of the invention, the valve, the pneumatic cylinder and the linkage—and optionally the spring—can be arranged to be standing side-by-side and are jointly applied to the lever. The side-by-side standing arrangement of the elements leads to a short height which is specifically advantageous when used in cryogenic environments.

In certain preferred embodiments of the invention, the pneumatic cylinder—and optionally the spring—stand on one side of the valve, while the linkage is arranged on the other side of the valve. During opening and closing movements, this results in a stepping-down because the valve is now arranged between the pneumatic cylinder and the linkage, so that a moving-out movement of the pneumatic cylinder results in a smaller opening movement in the valve. This stepping-down permits an extremely minute movement of the valve block in the valve seat and leads to a very exact proportioning.

The invention as well as additional details of the invention will be explained in detail in the following by means of an embodiment schematically illustrated in the figures.

Other objects, advantages and novel features of the present invention will become apparent from the following detailed description of the invention when considered in conjunction with the accompanying drawings.

DETAILED DESCRIPTION OF THE DRAWINGS

Figure 1:
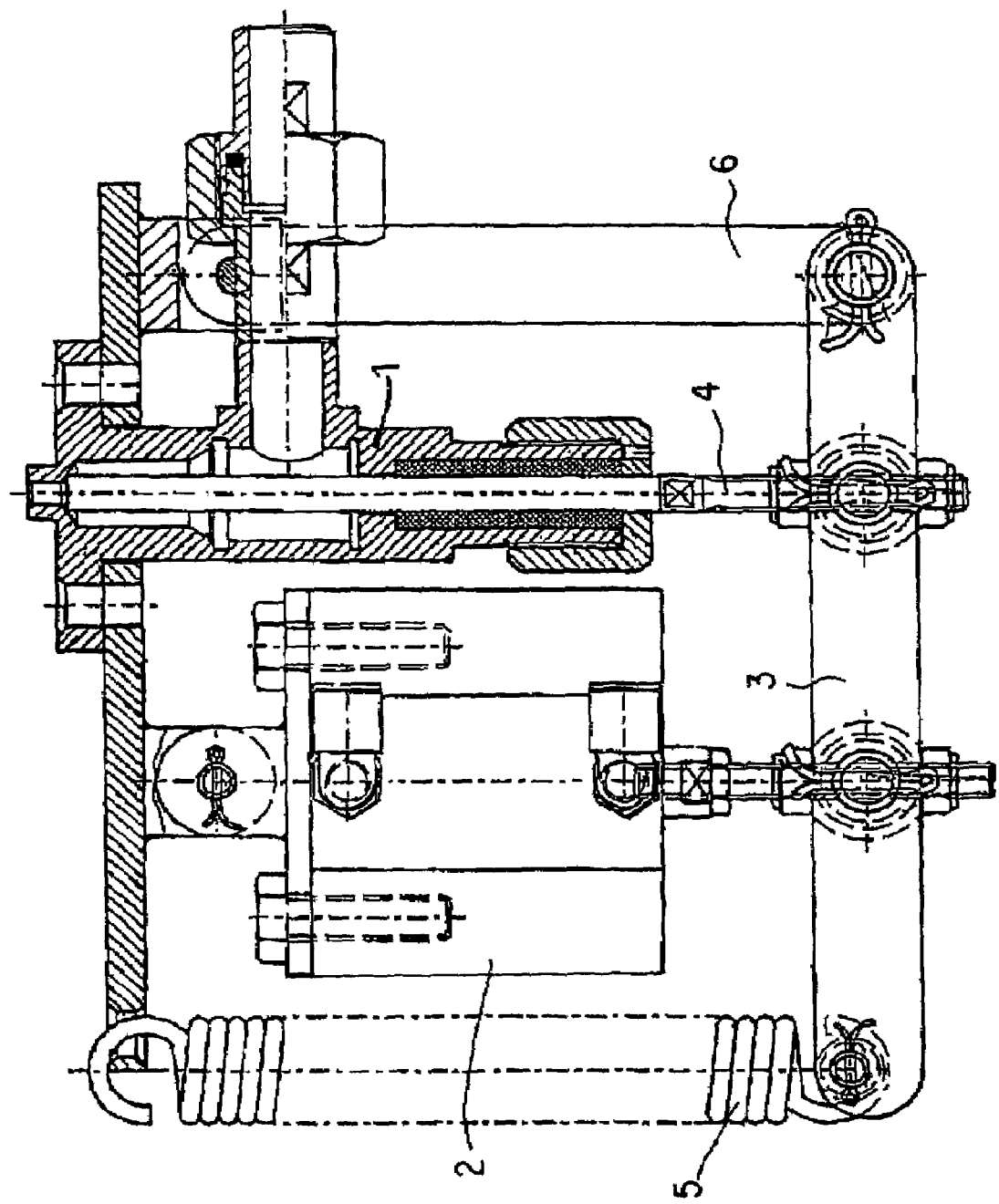
FIG. 1 is a part sectional view of an actuator assembly with a cryogenic valve in the closed valve position, constructed according to a preferred embodiment of the invention.
Figure 2:
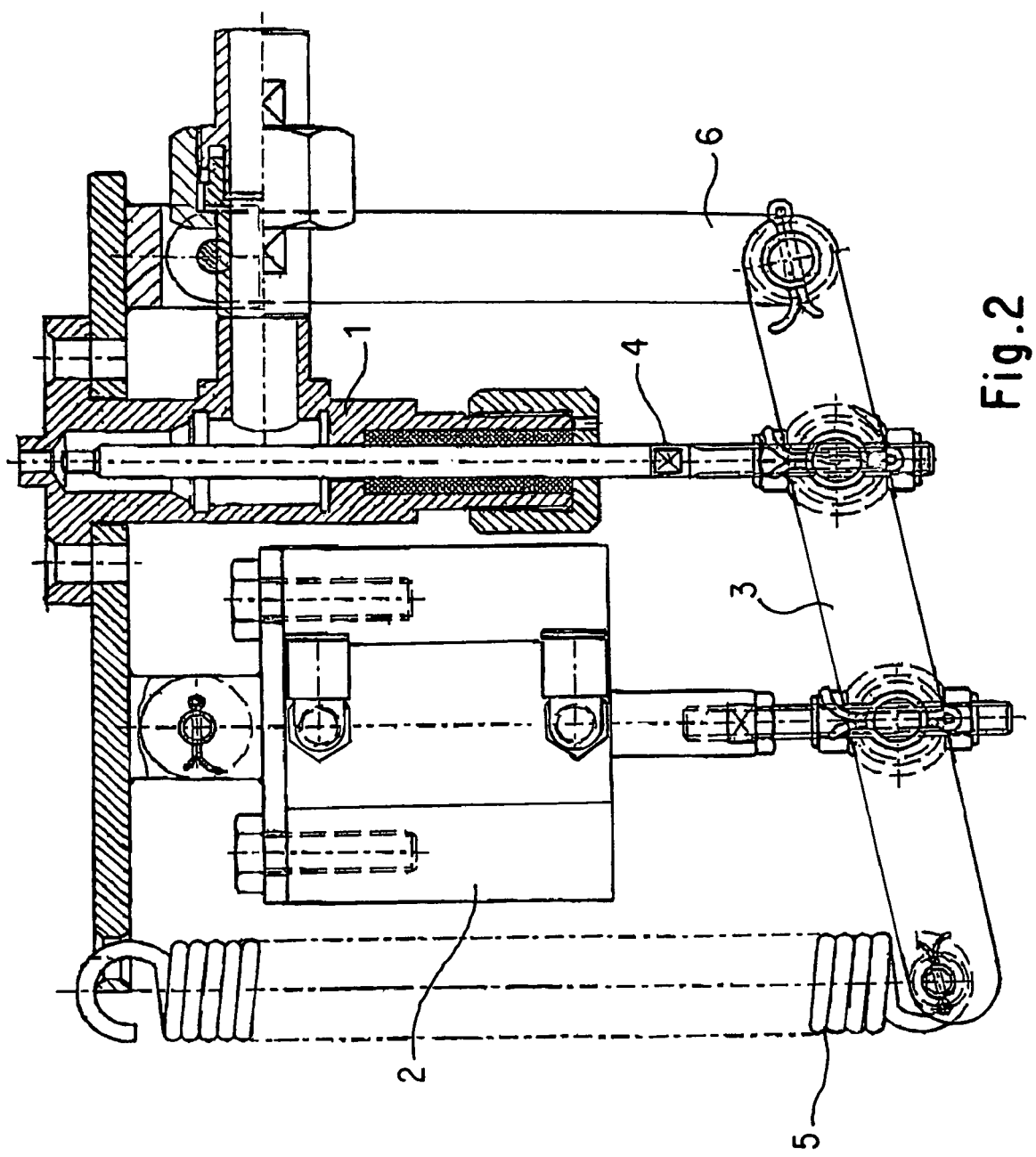
FIG. 2 is a part sectional view of the actuator assembly of FIG. 1, showing the cryogenic valve in the open valve position.
Figure 3:
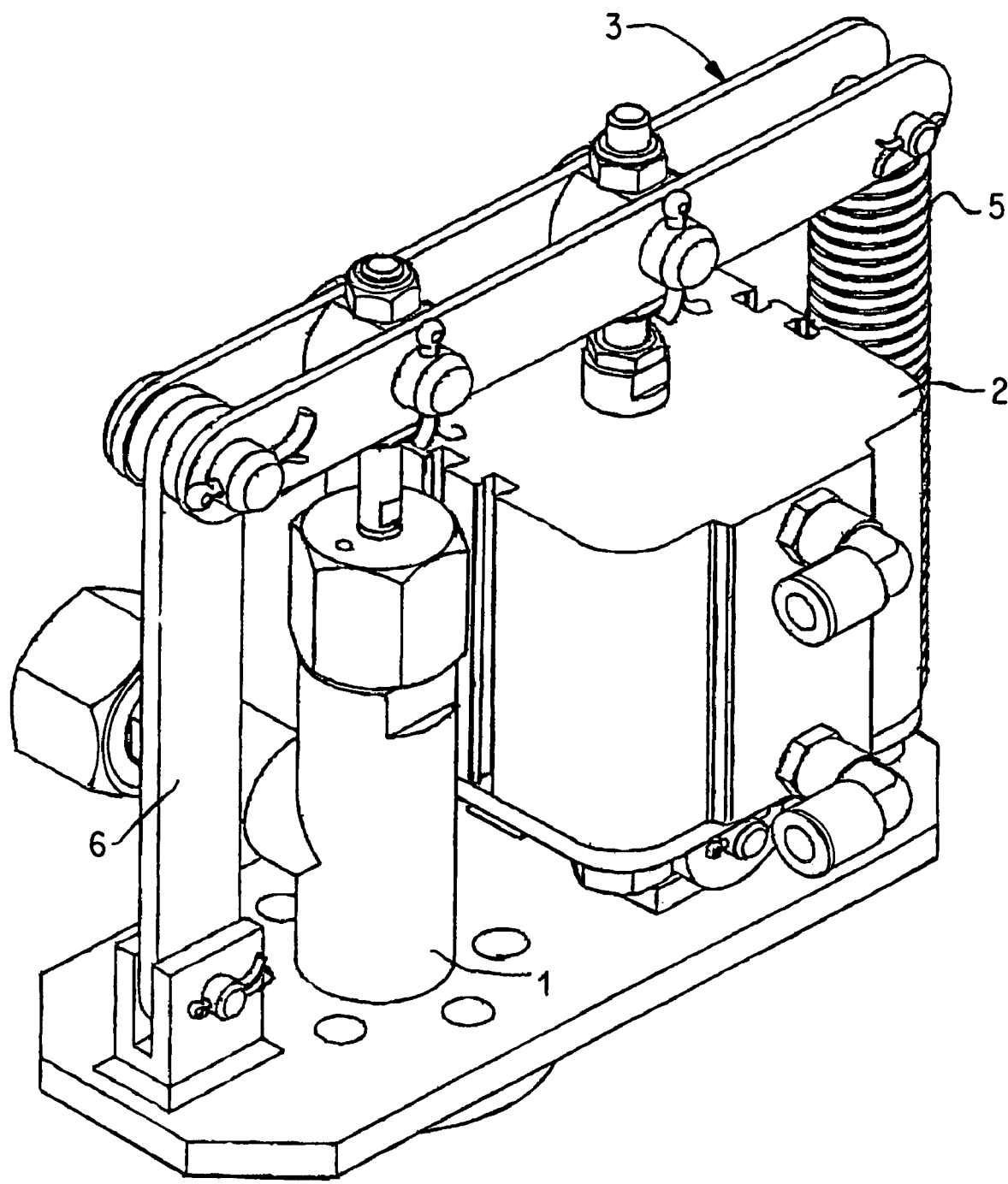
FIG. 3 is an isometric representation of the actuator assembly of FIGS. 1 and 2.
Figure 4:
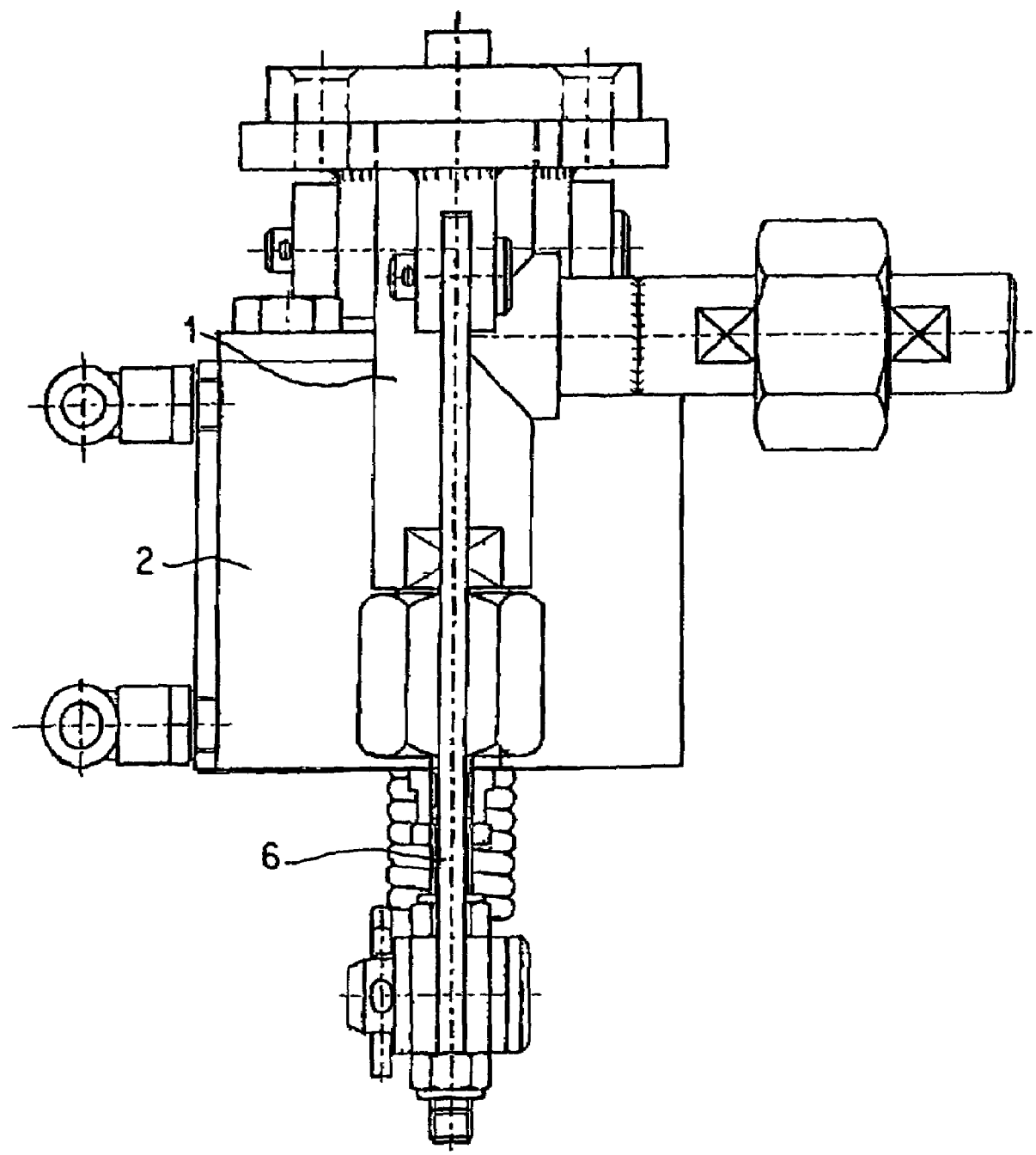
FIG. 4 is a lateral view of the actuator assembly of FIGS. 1–3.
Figure 5:
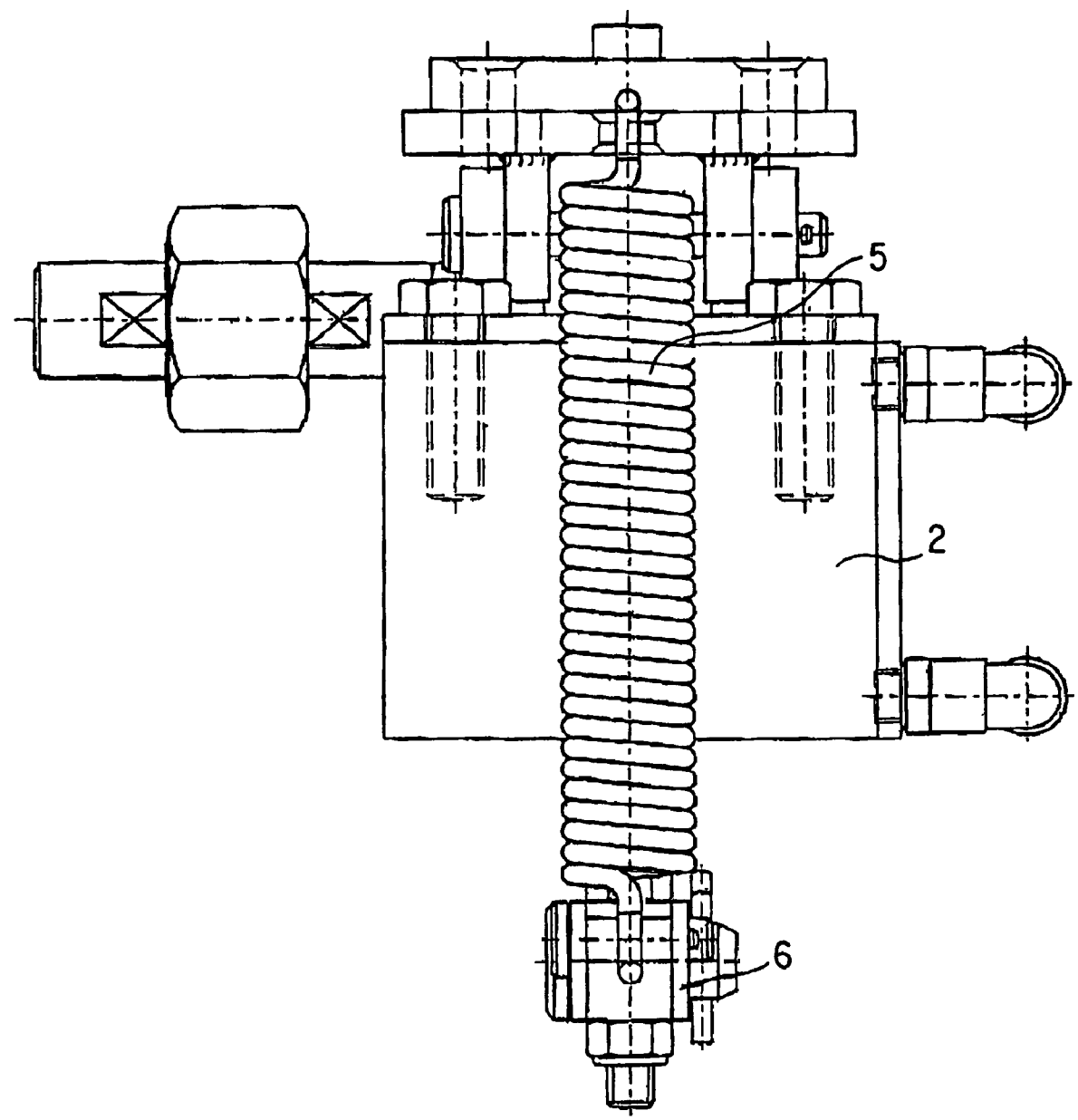
FIG. 5 is another lateral view of the actuator assembly according to FIGS. 1–4.
Figure 6:
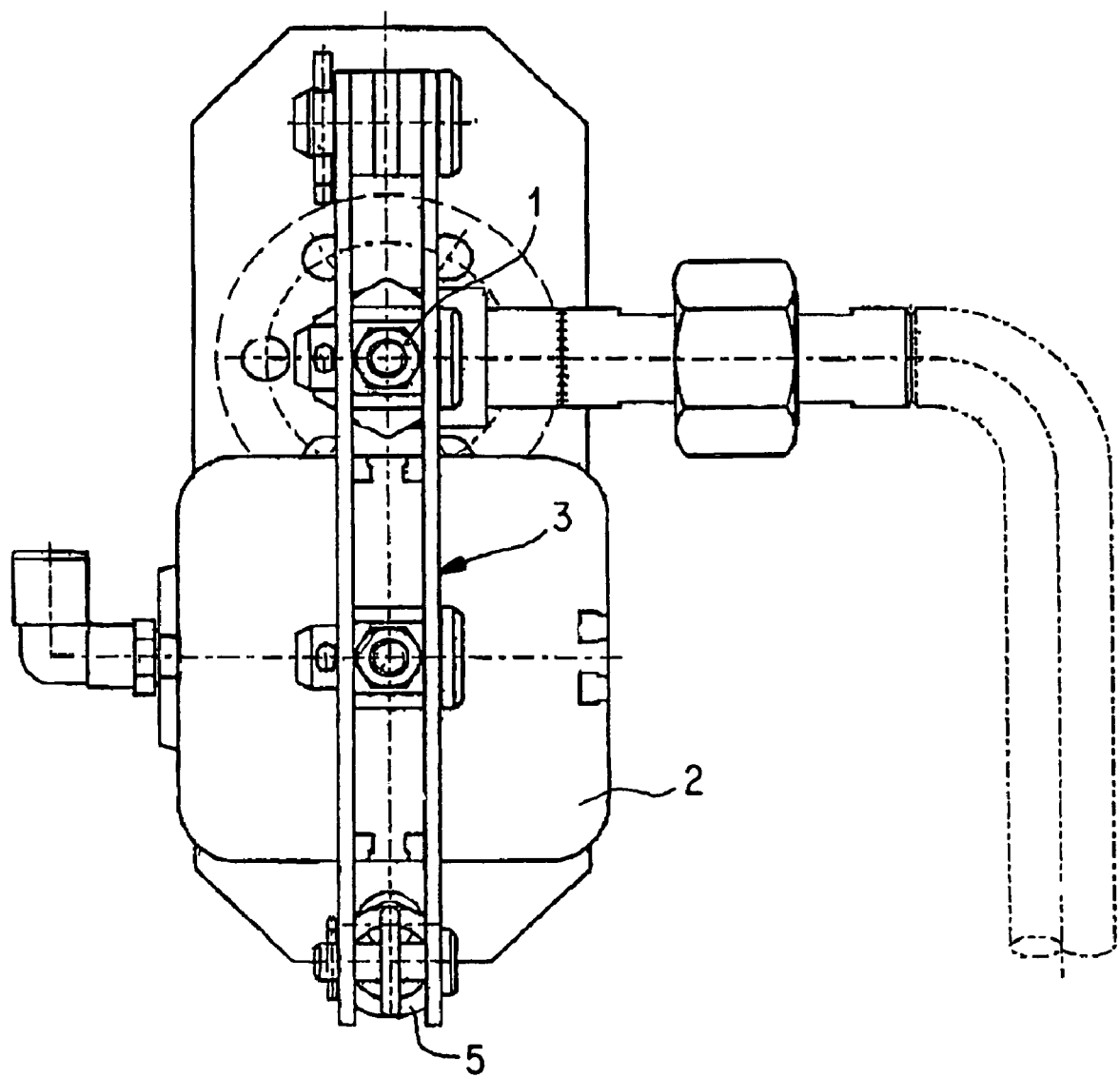
FIG. 6 is a top view of the actuator assembly of FIGS. 1–5.

The drawings illustrate an actuator for a cryogenic valve 1 with a pneumatic cylinder 2. By way of a lever 3, the pneumatic cylinder 2 is connected with a valve needle 4, the lever 3 being connected on one side with a spring 5 and being rotatably connected on the other side with a rotatably disposed linkage 6.

By the moving-out of the piston of the pneumatic cylinder 2, the spring 5 is extended, the valve needle 4 is withdrawn, and the valve 1 is changed into the open valve position. In this position, the cryogenic medium can be delivered by the valve.

For closing the valve 1, the restoring force of the spring 5 is utilized; the valve needle 4 moves in the direction of the valve seat and closes the valve 1. The delivery of cryogenic medium is thereby stopped as the valve 1 is closed.

The embodiment without a spring is not shown here. It differs from the illustrated embodiment in that the spring 5 is omitted and the pneumatic cylinder 2 is a double-acting cylinder. The lever 3 can then naturally have a shorter construction. The opening and closing takes place by moving the piston of the pneumatic cylinder 2 upward or downward.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve assembly for controlling flow of a cryogenic fluid, comprising:
a valve assembly platform;
a valve housing disposed on a top surface of the valve assembly platform, wherein a cryogenic fluid inlet orifice is disposed on the valve housing above the top surface of the valve assembly platform and wherein a cryogenic fluid outlet orifice is disposed on the valve housing at an under surface of the valve assembly platform,
a valve member supported at the valve housing for movement between a cryogenic fluid outlet orifice open position and a cryogenic fluid outlet orifice closed position,
a pneumatic cylinder disposed on the top surface of the valve assembly platform and laterally spaced from the valve member and thermally isolated with respect to a cryogenic fluid controlled by the valve member,
a lever operatively connecting the pneumatic cylinder with the valve member, and
a linkage pivotally connected with the lever at a position spaced from the valve member.

2. A valve assembly according to claim 1, wherein the pneumatic cylinder applies a force to the valve member in both a closing and an opening direction.

3. A valve assembly according to claim 1, wherein the linkage has one end pivotally connected with the lever and an opposite end pivotally connected at the valve assembly platform.

4. A valve assembly according to claim 1, wherein the pneumatic cylinder is a single acting cylinder operable to apply a force in only one direction of movement of the lever, and wherein a spring is provided to act on the lever in an opposite direction.

5. A valve assembly according to claim 1, wherein the valve member is a needle valve member supported for axial movement at the valve housing.

6. A valve assembly according to claim 1, further comprising a spring wherein a first end of the spring is attached to the lever and a second end of the spring is attached to the valve assembly platform.

7. A valve assembly according to claim 1, wherein a longitudinal axis of the cryogenic fluid inlet orifice is perpendicular to a longitudinal axis of the valve housing.

* * * * *